(12) United States Patent
Yu

(10) Patent No.: US 10,251,036 B2
(45) Date of Patent: Apr. 2, 2019

(54) NETWORK ARCHITECTURE IMPLEMENTING CONVERGENCE OF SMALL CELL AND M2M SYSTEM, RELATED METHOD, AND RELATED DEVICE

(71) Applicant: Huawei Technologies Co., Ltd., Shenzhen (CN)

(72) Inventor: Ming Yu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/829,326

(22) Filed: Dec. 1, 2017

(65) Prior Publication Data
US 2018/0084370 A1   Mar. 22, 2018

Related U.S. Application Data

(63) Continuation of application No. PCT/CN2015/080592, filed on Jun. 2, 2015.

(51) Int. Cl.
*H04W 4/02* (2018.01)
*H04W 4/70* (2018.01)
(Continued)

(52) U.S. Cl.
CPC ............ *H04W 4/70* (2018.02); *H04W 4/02* (2013.01); *H04W 76/10* (2018.02); *H04W 76/02* (2013.01); *H04W 84/045* (2013.01)

(58) Field of Classification Search
CPC .......... H04W 4/02; H04W 4/50; H04W 4/60; H04W 52/0258; H04W 52/0264; H04W 12/08; H04W 64/00; H04W 88/02; H04W 28/08; H04W 36/0011; H04W 88/14; H04W 84/045; H04W 64/003; H04W 4/025; H04W 88/16; H04W 12/06;
(Continued)

(56) References Cited

U.S. PATENT DOCUMENTS

| | | | | |
|---|---|---|---|---|
| 5,551,060 A * | 8/1996 | Fujii | ................... | H04W 16/02 343/890 |
| 6,256,500 B1 * | 7/2001 | Yamashita | ............ | H04W 36/04 455/437 |

(Continued)

FOREIGN PATENT DOCUMENTS

| | | |
|---|---|---|
| CN | 102075857 A | 5/2011 |
| CN | 102098237 A | 6/2011 |

(Continued)

*Primary Examiner* — Nimesh Patel
(74) *Attorney, Agent, or Firm* — Slater Matsil, LLP

(57) ABSTRACT

Embodiments of the present invention disclose a network architecture implementing convergence of a small cell and an M2M system, a related method, and a related device. The network architecture includes: a small cell in a small cell system and an M2M platform device in an M2M system. The small cell is connected to a service interface of the M2M platform device by using a first interface, service data in the M2M system is transmitted between the small cell and the M2M platform device by using the first interface, and when the service data needs to be sent to a user terminal served by the small cell, the small cell sends the service data to the user terminal.

16 Claims, 8 Drawing Sheets

(51) Int. Cl.
*H04W 76/10* (2018.01)
*H04W 76/02* (2009.01)
*H04W 84/04* (2009.01)

(58) Field of Classification Search
CPC .. H04W 60/04; H04W 72/0426; H04L 67/18;
H04L 12/2814; H04L 63/0853; H04L
63/107; H04L 61/2007; H04L 63/00;
H04L 65/1073; H04L 67/24; G01S 19/21
See application file for complete search history.

(56) References Cited

U.S. PATENT DOCUMENTS

| | | | |
|---|---|---|---|
| 2009/0318182 A1* | 12/2009 | Nagato | H04W 52/143 455/522 |
| 2010/0099410 A1 | 4/2010 | Sweeney et al. | |
| 2011/0117913 A1* | 5/2011 | Masuda | H04W 48/04 455/435.1 |
| 2012/0220307 A1 | 8/2012 | Wohlert et al. | |
| 2013/0157653 A1 | 6/2013 | Huang et al. | |
| 2013/0324154 A1* | 12/2013 | Raghupathy | G01S 19/10 455/456.1 |

FOREIGN PATENT DOCUMENTS

| | | |
|---|---|---|
| CN | 102111315 A | 6/2011 |
| JP | 2008283648 A | 11/2008 |
| JP | 2011120125 A | 6/2011 |
| JP | 2012004883 A | 1/2012 |
| JP | 2014138222 A | 7/2014 |

\* cited by examiner

NETWORK ARCHITECTURE IMPLEMENTING CONVERGENCE OF SMALL CELL AND M2M SYSTEM, RELATED METHOD, AND RELATED DEVICE

CROSS-REFERENCE TO RELATED APPLICATIONS

This application is a continuation of International Application No. PCT/CN2015/080592, filed on Jun. 2, 2015, the disclosure of which is hereby incorporated by reference in its entirety.

TECHNICAL FIELD

The present invention relates to the communications field, and in particular, to a network architecture implementing convergence of a small cell and a machine-to-machine (M2M) system, a related method, and a related device.

BACKGROUND

With popularity of wireless coverage and mobile broadband (MBB) services, indoor coverage gradually enhances, and small cells are deployed on a larger scale. However, with progress of technologies, in today's life, a small cell is deployed indoors, and a device in an M2M system may also be deployed indoors. At present, the small cell and the device in the M2M system have not been converged. An object served by the small cell may be a user terminal, that is, it may be understood that the object served by the small cell may be people. An object served by an indoor-deployed device in the M2M system, such as a household appliance, an electrical-device controller, or an environment monitor device, may include people. It can be learned that there is a common service object between the indoor-deployed small cell and the indoor-deployed device in the M2M system. Therefore, convergence of the small cell and the M2M system is a technical issue that needs to be urgently resolved at present.

SUMMARY

The present invention provides a network architecture implementing convergence of a small cell and an M2M system, a related method, and a related device, to implement convergence of a small cell and an M2M system.

According to a first aspect, embodiments of the present invention provide a network architecture implementing convergence of a small cell and an M2M system. The architecture includes: a small cell in a small cell system and an M2M platform device in an M2M system. The small cell is connected to a service interface of the M2M platform device by using a first interface, service data in the M2M system is transmitted between the small cell and the M2M platform device by using the first interface, and when the service data needs to be sent to a user terminal served by the small cell, the small cell sends the service data to the user terminal.

In a first possible implementation of the first aspect, the service data includes geographic location information; the small cell is further configured to: detect geographic location information of the user terminal, and send the geographic location information to the M2M platform device by using the first interface; the M2M platform device is further configured to send the geographic location information to an application server, so that the application server generates a control command for the M2M device according to the geographic location information; and the M2M platform device receives the control command sent by the application server, sends the control command to the M2M device by using an M2M gateway device, and the M2M device executes the control command.

With reference to the first possible implementation of the first aspect, in a second possible implementation of the first aspect, the M2M device includes a currently-controlled M2M device; and the application server is specifically configured to: select, according to the geographic location information, an M2M device that needs to be controlled currently as the currently-controlled M2M device; generate, according to a preset control policy, a control command corresponding to the geographic location information; and use the control command as the control command for the currently-controlled M2M device.

With reference to the first possible implementation of the first aspect, in a third possible implementation of the first aspect, the service data includes detection result information that needs to be notified to a user; the M2M device is further configured to: detect a preset object to obtain a detection result, and send the detection result to the application server; when determining that the detection result is the detection result information that needs to be notified to the user, the application server sends the detection result information to the M2M platform device; the M2M platform device is further configured to send the detection result information to the small cell by using the service interface; and the small cell is further configured to send a prompt message including content of the detection result information to the user terminal.

With reference to the third possible implementation of the first aspect, in a fourth possible implementation of the first aspect, the user terminal includes a currently-notified user terminal, where the application server is further configured to select a user terminal corresponding to the M2M device as the currently-notified user terminal; and the M2M platform device is specifically configured to send, by using the service interface, the detection result information to a small cell that serves the currently-notified user terminal.

With reference to the fourth possible implementation of the first aspect, in a fifth possible implementation of the first aspect, the application server is specifically configured to select a user terminal that is bound to the M2M device in advance as the currently-notified user terminal; or the application server is specifically configured to select, as the currently-notified user terminal, a user terminal with a distance between a geographic location of the user terminal and a geographic location of the M2M device being within a preset distance.

With reference to any one of the foregoing possible implementations of the first aspect, in a sixth possible implementation of the first aspect, the small cell is further connected to an M2M device in the M2M system by using a second interface, and the small cell provides network access for the M2M device by using the second interface.

According to a second aspect, embodiments of the present invention provide a machine-to-machine M2M device control method. The method includes detecting, by a small cell, geographic location information of a user terminal served by the small cell. The method also includes sending, by the small cell, the geographic location information to an M2M platform device by using a first interface connected to a service interface of the M2M platform device, so that the M2M platform device sends the geographic location information to an application server, the application server generates a control command for an M2M device according to the geographic location information, the M2M platform device receives the control command sent by the application server and sends the control command to the M2M device by using an M2M gateway device, and the M2M device executes the control command.

In a first possible implementation of the second aspect, the method further includes: establishing, by the small cell, the first interface, and establishing a communication connection to the service interface of the M2M platform device by using the first interface; and the sending, by the small cell, the geographic location information to an M2M platform device by using a first interface connected to a service interface of the M2M platform device includes: sending, by the small cell, the geographic location information to the M2M platform device by using the communication connection.

With reference to the second aspect or the first possible implementation of the second aspect, in a second possible implementation of the second aspect, the method further includes: connecting, by the small cell, to the M2M device by using a second interface, where the small cell provides network access for the M2M device by using the second interface.

According to a third aspect, embodiments of the present invention provide a machine-to-machine M2M device control method. The method includes receiving, by an M2M platform device by using a service interface connected to a first interface of a small cell, geographic location information sent by the small cell, where the geographic location information is geographic location information, detected by the small cell, of a user terminal served by the small cell. The method also includes sending, by the M2M platform device, the geographic location information to an application server, so that the application server generates a control command for a M2M device according to the geographic location information. The method also includes receiving, by the M2M platform device, the control command sent by the application server, and sending the control command to the M2M device by using an M2M gateway device, so that the M2M device executes the control command.

In a first possible implementation of the third aspect, the method further includes: establishing, by the M2M platform device, the service interface, and establishing a communication connection to the first interface of the small cell by using the service interface; and the receiving, by an M2M platform device by using a service interface connected to a first interface of a small cell, geographic location information sent by the small cell includes: receiving, by the M2M platform device by using the communication connection, the geographic location information sent by the small cell.

According to a fourth aspect, embodiments of the present invention provide a message prompt method. The method includes receiving, by a machine-to-machine M2M platform device, detection result information sent by an application server, where the detection result information is a detection result that is reported by an M2M device and that, as determined by the application server, needs to be notified to a user, and the detection result is a detection result obtained by detecting a preset object by the M2M device. The method also includes sending, by the M2M platform device, the detection result information to a small cell by using a service interface connected to a first interface of the small cell, so that the small cell sends, to a user terminal served by the small cell, a prompt message including content of the detection result information.

In a first possible implementation of the fourth aspect, the method further includes: establishing, by the M2M platform device, the service interface, and establishing a communication connection to the first interface of the small cell by using the service interface; and the sending, by the M2M platform device, the detection result information to a small cell by using a service interface connected to a first interface of the small cell includes: sending, by the M2M platform device, the detection result information to the small cell by using the communication connection.

According to a fifth aspect, embodiments of the present invention provide a message prompt method. The method includes receiving, by a small cell by using a first interface connected to a service interface of a machine-to-machine M2M platform device, detection result information sent by the M2M platform device, where the detection result information is sent by an application server and is received by the M2M platform device, the detection result information is a detection result that is reported by an M2M device and that, as determined by the application server, needs to be notified to a user, and the detection result is a detection result obtained by detecting a preset object by the M2M device. The method also includes sending, by the small cell, a prompt message including content of the detection result information to a user terminal served by the small cell.

In a first possible implementation of the fifth aspect, the method further includes: establishing, by the small cell, the first interface, and establishing a communication connection to the service interface of the M2M platform device by using the first interface; and the receiving, by a small cell, by using a first interface connected to a service interface of a machine-to-machine M2M platform device, detection result information sent by the M2M platform device includes: receiving, by the small cell by using the communication connection, the detection result information sent by the M2M platform device.

With reference to the fifth aspect or the first possible implementation of the fifth aspect, in a second possible implementation of the fifth aspect, the method further includes: connecting, by the small cell, to the M2M device by using a second interface, where the small cell provides network access for the M2M device by using the second interface.

According to a sixth aspect, embodiments of the present invention provide a small cell, including a detection unit and a sending unit, where the detection unit is configured to detect geographic location information of a user terminal served by the small cell; and the sending unit is configured to send the geographic location information to an M2M platform device by using a first interface connected to a service interface of the M2M platform device, so that the M2M platform device sends the geographic location information to an application server, the application server generates a control command for an M2M device according to the geographic location information, the M2M platform device receives the control command sent by the application server and sends the control command to the M2M device by using an M2M gateway device, and the M2M device executes the control command.

In a first possible implementation of the sixth aspect, the small cell further includes: an establishment unit, configured to establish the first interface, and establish a communication connection to the service interface of the M2M platform device by using the first interface; and the sending unit is configured to send the geographic location information to the M2M platform device by using the communication connection.

With reference to the sixth aspect or the first possible implementation of the sixth aspect, in a second possible implementation of the sixth aspect, the small cell further includes: a connection unit, configured to connect to the M2M device by using a second interface, where the small cell provides network access for the M2M device by using the second interface.

According to a seventh aspect, embodiments of the present invention provide a machine-to-machine M2M platform device, including a first receiving unit, a first sending unit, a second receiving unit, and a second sending unit. The first receiving unit is configured to receive, by using a service interface connected to a first interface of a small cell, geographic location information sent by the small cell, where the geographic location information is geographic location information, detected by the small cell, of a user terminal served by the small cell. The first sending unit is configured to send the geographic location information to an application server, so that the application server generates a control command for an M2M device according to the geographic location information. The second receiving unit is configured to receive the control command sent by the application server. The second sending unit is configured to send the control command to the M2M device by using an M2M gateway device, so that the M2M device executes the control command.

In a first possible implementation of the seventh aspect, the M2M platform device further includes: an establishment unit, configured to establish the service interface, and establish a communication connection to the first interface of the small cell by using the service interface; and the first receiving unit is configured to receive, by using the communication connection, the geographic location information sent by the small cell.

According to an eighth aspect, embodiments of the present invention provide an M2M platform device, including a receiving unit and a sending unit. The receiving unit is configured to receive detection result information sent by an application server, where the detection result information is a detection result that is reported by an M2M device and that, as determined by the application server, needs to be notified to a user, and the detection result is a detection result obtained by detecting a preset object by the M2M device. The sending unit is configured to send the detection result information to a small cell by using a service interface connected to a first interface of the small cell, so that the small cell sends, to a user terminal served by the small cell, a prompt message including content of the detection result information.

In a first possible implementation of the eighth aspect, the M2M platform device further includes: an establishment unit, configured to establish the service interface, and establish a communication connection to the first interface of the M2M platform device by using the service interface; and the sending unit is configured to send the detection result information to the small cell by using the communication connection.

According to a ninth aspect, embodiments of the present invention provide a small cell, including a receiving unit and a sending unit. The receiving unit is configured to receive, by using a first interface connected to a service interface of a machine-to-machine M2M platform device, detection result information sent by the M2M platform device, where the detection result information is sent by an application server and is received by the M2M platform device, the detection result information is a detection result that is reported by an M2M device and that, as determined by the application server, needs to be notified to a user, and the detection result is a detection result obtained by detecting a preset object by the M2M device. The sending unit is configured to send, to a user terminal served by the small cell, a prompt message including content of the detection result information.

In a first possible implementation of the ninth aspect, the small cell further includes: an establishment unit, configured to establish the first interface, and establish a communication connection to the service interface of the M2M platform device by using the first interface; and the receiving unit is configured to receive, by using the communication connection, the detection result information sent by the M2M platform device.

With reference to the ninth aspect or the first possible implementation of the ninth aspect, the small cell further includes: a connection unit, configured to connect to the M2M device by using a second interface, where the small cell provides network access for the M2M device by using the second interface.

According to a tenth aspect, embodiments of the present invention provide a small cell, including a processor, a network interface, a memory, and a communications bus. The communications bus is configured to implement connection and communication between the processor, the network interface, and the memory. The processor executes a program stored in the memory to implement a method. The method includes detecting geographic location information of a user terminal served by the small cell. The method also includes sending the geographic location information to an M2M platform device by using a first interface connected to a service interface of the M2M platform device, so that the M2M platform device sends the geographic location information to an application server, the application server generates a control command for an M2M device according to the geographic location information, the M2M platform device receives the control command sent by the application server and sends the control command to the M2M device by using an M2M gateway device, and the M2M device executes the control command.

In a first possible implementation of the tenth aspect, the program executed by the processor further includes: establishing the first interface, and establishing a communication connection to the service interface of the M2M platform device by using the first interface; and the program, executed by the processor, of sending the geographic location information to an M2M platform device by using a first interface connected to a service interface of the M2M platform device includes: sending the geographic location information to the M2M platform device by using the communication connection.

With reference to the tenth aspect or the first possible implementation of the tenth aspect, in a second possible implementation of the tenth aspect, the program executed by the processor further includes: connecting to the M2M device by using a second interface, where the small cell provides network access for the M2M device by using the second interface.

According to an eleventh aspect, embodiments of the present invention provide a machine-to-machine M2M device, including a processor, a network interface, a memory, and a communications bus. The communications bus is configured to implement connection and communication between the processor, the network interface, and the memory. The processor executes a program stored in the memory to implement a method. The method includes receiving, by using a service interface connected to a first interface of a small cell, geographic location information sent by the small cell, where the geographic location information is geographic location information, detected by the small cell, of a user terminal served by the small cell. The method also includes sending the geographic location information to an application server, so that the application server generates a control command for an M2M device according to the geographic location information. The method also includes receiving the control command sent by the application server, and sending the control command to the M2M device by using an M2M gateway device, so that the M2M device executes the control command.

In a first possible implementation of the eleventh aspect, the program executed by the processor further includes: establishing the service interface, and establishing a communication connection to the first interface of the small cell by using the service interface; and the program, executed by the processor, of receiving, by using a service interface connected to a first interface of a small cell, geographic location information sent by the small cell includes: receiving, by using the communication connection, the geographic location information sent by the small cell.

According to a twelfth aspect, embodiments of the present invention provide a machine-to-machine M2M platform device, including a processor, a network interface, a memory, and a communications bus. The communications bus is configured to implement connection and communication between the processor, the network interface, and the memory. The processor executes a program stored in the memory to implement a method. The method includes receiving detection result information sent by an application server, where the detection result information is a detection result that is reported by an M2M device and that, as determined by the application server, needs to be notified to a user, and the detection result is a detection result obtained by detecting a preset object by the M2M device. The method also includes sending the detection result information to a small cell by using a service interface connected to a first interface of the small cell, so that the small cell sends, to a user terminal served by the small cell, a prompt message including content of the detection result information.

In a first possible implementation of the twelfth aspect, the program executed by the processor further includes: establishing the service interface, and establishing a communication connection to the first interface of the small cell by using the service interface; and the program, executed by the processor, of sending the detection result information to a small cell by using a service interface connected to a first interface of the small cell includes: sending the detection result information to the small cell by using the communication connection.

According to a thirteenth aspect, embodiments of the present invention provide a small cell, including a processor, a network interface, a memory, and a communications bus. The communications bus is configured to implement connection and communication between the processor, the network interface, and the memory. The processor executes a program stored in the memory to implement a method. The method includes receiving, by using a first interface connected to a service interface of a machine-to-machine M2M platform device, detection result information sent by the M2M platform device, where the detection result information is sent by an application server and is received by the M2M platform device, the detection result information is a detection result that is reported by an M2M device and that, as determined by the application server, needs to be notified to a user, and the detection result is a detection result obtained by detecting a preset object by the M2M device. The method also includes sending a prompt message including content of the detection result information to a user terminal served by the small cell.

In a first possible implementation of the thirteenth aspect, the program executed by the processor further includes: establishing the first interface, and establishing a communication connection to the service interface of the M2M platform device by using the first interface; and the program, executed by the processor, receiving, by using a first interface connected to a service interface of a machine-to-machine M2M platform device, detection result information sent by the M2M platform device includes: receiving, by using the communication connection, the detection result information sent by the M2M platform device.

In the foregoing technical solutions, the network architecture implementing convergence of the small cell and the M2M system includes: the small cell and the M2M platform device in the M2M system. The small cell is connected to the service interface of the M2M platform device by using the first interface, the service data in the M2M system is transmitted between the small cell and the M2M platform device by using the first interface, and when the service data needs to be sent to the user terminal served by the small cell, the small cell sends the service data to the user terminal. In this way, convergence of the small cell and the M2M system can be implemented. In addition, objects served by the small cell and a device in the M2M system all include people. Therefore, a service can be provided to a user more quickly and conveniently by using convergence of the small cell and the M2M system.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
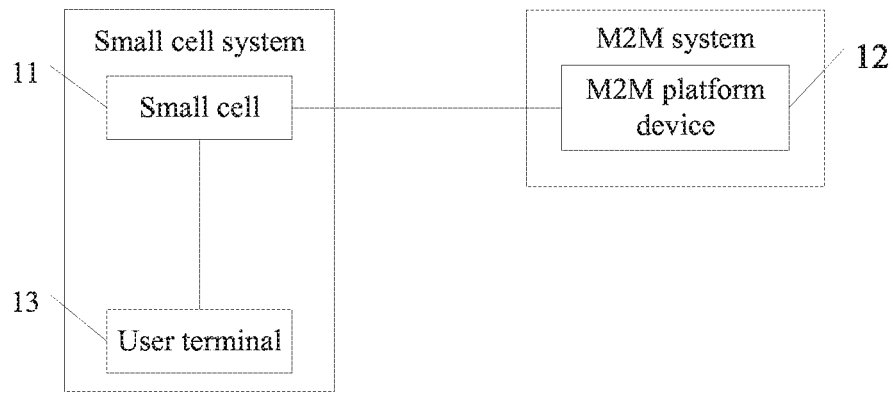
FIG. 1 is a schematic structural diagram of a network architecture implementing convergence of a small cell and an M2M system according to an embodiment of the present invention.

Referring to FIG. 1, FIG. 1 is a schematic structural diagram of a network architecture implementing convergence of a small cell and an M2M system according to an embodiment of the present invention. As shown in FIG. 1, the architecture includes: a small cell 11 in a small cell system and an M2M platform device 12 in an M2M system.

The small cell 11 is connected to a service interface of the M2M platform device 12 by using a first interface. Service data in the M2M system is transmitted between the small cell 11 and the M2M platform device 12 by using the first interface. When the service data needs to be sent to a user terminal 13 served by the small cell 11, the small cell 11 sends the service data to the user terminal 13.

In this embodiment, the small cell 11 may be a small cell deployed indoors. Certainly, in this embodiment, it is not limited that the small cell 11 is a small cell deployed indoors. In this embodiment, the small cell 11 may be deployed outdoors.

In this embodiment, both the first interface of the small cell 11 and the service interface of the M2M platform device 12 are pre-established logical interfaces. In addition, that the small cell 11 is connected to the service interface of the M2M platform device 12 by using the first interface may be that the small cell 11 uses the first interface and the service interface of the M2M platform device 12 to connect to a network. For example, when the small cell 11 and the M2M platform device 12 are deployed on a same local area network, the small cell 11 and the M2M platform device 12 can establish a local area network connection by using the foregoing two interfaces. In addition, the small cell 11 and the M2M platform device 12 can establish an Internet connection by using the foregoing two interfaces. In this embodiment, the connection between the small cell 11 and the M2M platform device 12 is directly established by using the foregoing two interfaces. In this way, the small cell 11 and the M2M platform device 12 can directly communicate, with no need to pass through a core network. This saves a network resource and improves data transmission efficiency.

In this embodiment, the service data in the M2M system may be any service in the M2M system, for example, input service data in the M2M system or output service data in the M2M system. For example, service data detected by the small cell 11 is used as an input of the M2M system, and the M2M system performs, according to the input, corresponding control and management. Alternatively, the service data in the M2M system may be service data transmitted by the M2M system to the small cell 11. For example, service data collected from the M2M system is used as an input of the small cell 11, and the small cell 11 performs a corresponding operation on the user terminal according to the input.

In this embodiment, convergence of the small cell and the M2M system can be implemented in the network architecture. Alternatively, it can be understood that convergence of a small cell system and the M2M system is implemented. Service objects of both the small cell and the M2M system include a user (person). Therefore, a service can be provided to the user more quickly and conveniently in a convergent network architecture. In addition, service data transmission is performed, with no need to pass through the core network, thereby saving a network resource.

In this embodiment, the network architecture implementing convergence of the small cell and the M2M system includes: the small cell and the M2M platform device in the M2M system. The small cell is connected to the service interface of the M2M platform device by using the first interface, the service data in the M2M system is transmitted between the small cell and the M2M platform device by using the first interface, and when the service data needs to be sent to the user terminal served by the small cell, the small cell sends the service data to the user terminal. In this way, convergence of the small cell and the M2M system can be implemented. In addition, objects served by the small cell and a device in the M2M system all include people. Therefore, a service can be provided to a user more quickly and conveniently by using convergence of the small cell and the M2M system.

Figure 2:
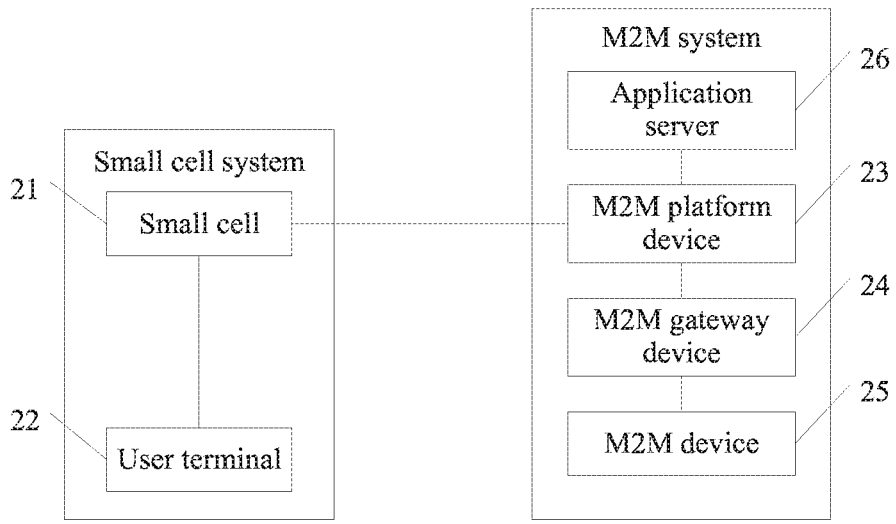
FIG. 2 is a schematic structural diagram of another network architecture implementing convergence of a small cell and an M2M system according to an embodiment of the present invention.

Referring to FIG. 2, FIG. 2 is a schematic structural diagram of another network architecture implementing convergence of a small cell and an M2M system according to an embodiment of the present invention. As shown in FIG. 2, the network architecture includes a small cell 21, a user terminal 22 served by the small cell 21, an M2M platform device 23, an M2M gateway device 24 connected to the M2M platform device 23, an M2M device 25 connected to the M2M gateway device 24, and an application server 26 connected to the M2M platform device 23.

The small cell 21 is connected to a service interface of the M2M platform device 23 by using a first interface.

The small cell 21 is configured to: detect geographic location information of the user terminal 22, and send the geographic location information to the M2M platform device 23 by using the first interface.

The M2M platform device 23 is configured to send the geographic location information to the application server 26, and the application server 26 generates a control command for the M2M device 25 according to the geographic location information.

The M2M platform device 23 receives the control command sent by the application server 26, and sends the control command to the M2M device 25 by using the M2M gateway device 24.

The M2M device 25 is configured to execute the control command.

In this embodiment, the M2M device 25 may be an M2M terminal, for example, an indoor household appliance or an outdoor electrical device. In addition, the M2M device 25 may be a controller to control an M2M terminal, for example, an electrical-device controller, an access controller, or a smoke controller. In addition, the M2M device 25 may be a sensor, for example, a smoke sensor, a fire sensor, or an access control sensor. In addition, the M2M device 25 may be one or more M2M devices.

In the foregoing network architecture, the small cell 21 sends the detected geographic location information of the user terminal 22 to the M2M platform device 23, and the M2M platform device 23 sends the geographic location information to the application server 26. In this way, the application server 26 may generate the control command according to the geographic location information. For example, when the geographic location information indicates that there is no user at a location of the M2M device 25, the application server 26 may generate a control command for turning off the M2M device, for example, a control command for turning off a light or an air conditioner. When receiving the control command, the M2M device 25 executes the command. The small cell 21 may be used as an input of the M2M system, and a device in the M2M system is controlled according to the input. In addition, in the M2M system, data detected by using the small cell 21 may be used as an input. Therefore, some sensors may be removed from the M2M system in this embodiment. For example, a household appliance switch may require no sensor for detecting entrance and exit of a user, but may use geographic location information, detected by the small cell 21, of a user terminal for control. For example, when the small cell 21 detects that the user terminal enters the location of the M2M device 25, the application server 26 can generate a control command for controlling the M2M device 25 to turn on an M2M terminal such as a light or an air conditioner, thereby reducing costs of an M2M system.

In this embodiment, the control command generated by the application server 26 may be a control command for a specific M2M device. The specific M2M device may be defined as a currently-controlled M2M device. For example, the application server 26 may be specifically configured to: select, according to the geographic location information, an M2M device that needs to be controlled currently as the currently-controlled M2M device; generate, according to a preset control policy, a control command corresponding to the geographic location information; and use the control command as the control command for the currently-controlled M2M device. For example, the geographic location information detected by the small cell 21 indicates that there is no user at a location of an M2M device A, and there are a large quantity of users at a location of an M2M device B. Therefore, the application server 26 may generate a control command for controlling the M2M device A to turn off a light, or certainly, may generate a control command for controlling the M2M device B to turn on more lights. In addition, the control policy may be generated in advance, for example, be set by the user in advance. The control policy may represent a correspondence between the geographic location information and the control command, that is, control commands corresponding to different geographic location information may be generated by using the control policy. For example, when there is no user at the location of the M2M device, a control command for turning off an electric appliance by the M2M device may be generated. Alternatively, when there is a user at the location of the M2M device, and an electric appliance controlled by the M2M device is not turned on, a control command for turning on the electric appliance by the M2M device may be generated.

In this embodiment, the M2M device 25 may be further configured to: detect a preset object to obtain a detection result, and send the detection result to the application server 26.

When determining that the detection result is detection result information that needs to be notified to the user, the application server 26 sends the detection result information to the M2M platform device 23.

The M2M platform device 23 may be further configured to send the detection result information to the small cell 21 by using the service interface.

The small cell 21 is further configured to send a prompt message including content of the detection result information to the user terminal.

In this network architecture, the M2M device 25 may detect a preset object, such as smoke, access control, and fire alarm, and send a detection result to the application server 26. The application server 26 may perform determining on the detection result. When determining that the detection result needs to be notified to the user, the application server 26 may send the detection result information to the M2M platform device 23. The M2M platform device 23 may send the detection result information to the small cell 21. The small cell 21 sends the prompt message including content of the detection result information to the user terminal. In this way, a user can be notified quickly. For example, when access control becomes faulty, the user is notified of the faulty access control by using the network architecture, so that the user can make corresponding countermeasures in a timely manner.

In this embodiment, the user terminal that receives the prompt message may be a specific user terminal. The specific user terminal may be defined as a currently-notified user terminal that needs to be notified currently. For example, the application server 26 may be further configured to select a user terminal corresponding to the M2M device as the currently-notified user terminal.

The M2M platform device 23 may be specifically configured to send, by using the service interface, the detection result information to the small cell 21 that serves the currently-notified user terminal. In this way, the prompt message may be sent to the currently-notified user terminal. Alternatively, the M2M platform device 23 may be specifically configured to send, by using the service interface, the detection result information to the small cell 21 accessed by the currently-notified user terminal.

The application server 26 may be specifically configured to select a user terminal bound to the M2M device as the currently-notified user terminal. For example, when the M2M device 25 detects an access control alarm, a fire alarm, or the like, a security guard or an administrator may be notified.

In addition, the application server 26 may be specifically configured to select, as the currently-notified user terminal, a user terminal with a distance between a geographic location of the user terminal and a geographic location of the M2M device being within a preset distance. For example, when the M2M device 25 detects smoke, a user close to the M2M device 25 may be notified.

In this embodiment, connecting the small cell 21 to the service interface of the M2M platform device 23 by using the first interface may be defined as SM_IOT, where SM represents a small cell system, and IOT represents an M2M system.

In this embodiment, the small cell 21 may be further connected to the M2M device 25 by using a second interface, and the small cell 21 provides network access for the M2M device 25 by using the second interface.

In this implementation, the small cell 21 and the M2M device 25 may be at a same location. In this way, the small cell 21 and the M2M device 25 may be connected to a network by using a local area network. Therefore, the M2M device 25 may be connected to the network by using the small cell 21.

In addition, connecting the second interface of the small cell 21 to the M2M device 25 may be connecting the second interface of the small cell 21 to a network interface of the M2M device 25. The two interfaces may be both preset logical interfaces. For example, connection between the second interface of the small cell 21 and the network interface of the M2M device 25 may be defined as LTE-M, that is, an LTE network is connected to the M2M device.

In this embodiment, on a basis of the embodiment shown in FIG. 1, multiple optional implementations are added, and convergence of a small cell and an M2M system can be implemented in all the multiple optional implementations.

Figure 3:
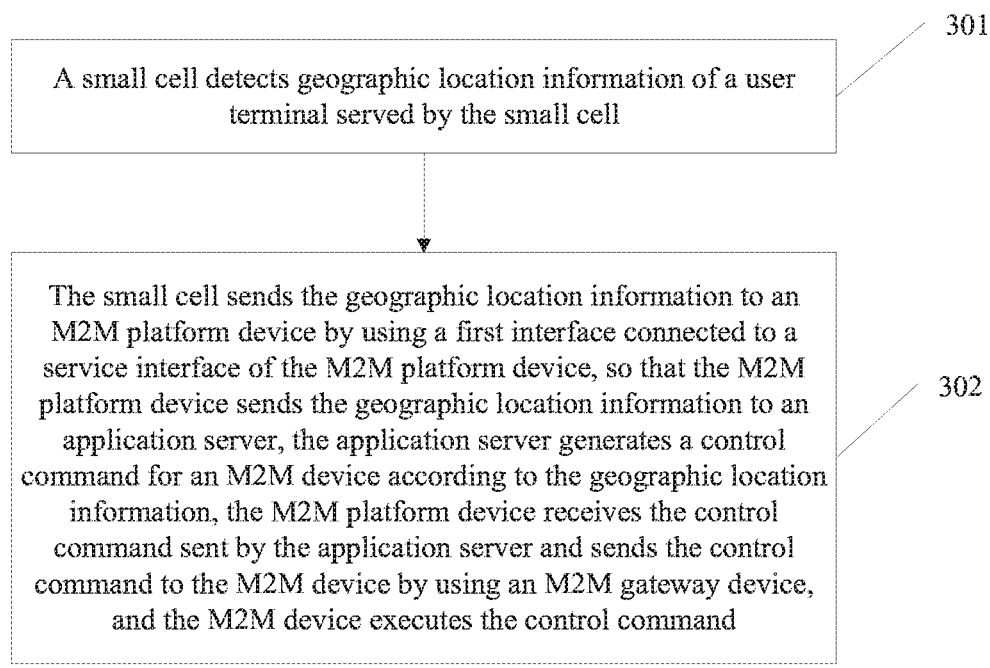
FIG. 3 is a schematic flowchart of an M2M device control method according to an embodiment of the present invention.

Referring to FIG. 3, FIG. 3 is a schematic flowchart of an M2M device control method according to an embodiment of the present invention. As shown in FIG. 3, the method includes the following steps.

A small cell detects geographic location information of a user terminal served by the small cell.

In step 301, the geographic location information of the user terminal can be detected by using a message reported by the user terminal, or in step 301, the geographic location information of the user terminal can be obtained by detecting signal strength of the user terminal.

302. The small cell sends the geographic location information to an M2M platform device by using a first interface connected to a service interface of the M2M platform device, so that the M2M platform device sends the geographic location information to an application server, the application server generates a control command for an M2M device according to the geographic location information, the M2M platform device receives the control command sent by the application server and sends the control command to the M2M device by using an M2M gateway device, and the M2M device executes the control command.

According to the foregoing steps, the geographic location information detected by the small cell may be used as an input of an M2M system, and then the M2M system controls a corresponding device according to the input. This implements convergence of the small cell and the M2M system.

In this embodiment, the foregoing method may further include the following step: establishing, by the small cell, the first interface, and establishing a communication connection to the service interface of the M2M platform device by using the first interface; and the step in which the small cell sends the geographic location information to the M2M platform device by using the first interface connected to the service interface of the M2M platform device may include: sending, by the small cell, the geographic location information to the M2M platform device by using the communication connection.

In this embodiment, the foregoing method may further include the following step: connecting, by the small cell, to the M2M device by using a second interface, where the small cell provides network access for the M2M device by using the second interface.

In this implementation, it can be implemented that the M2M device in the M2M system may access a network by using the small cell.

It should be noted that the method described in this embodiment may be applied to the network architectures shown in FIG. 1 and FIG. 2. In addition, implementations described in the network architectures shown in FIG. 1 and FIG. 2 may also be applied to the method. Details are not further described herein.

In this embodiment, the small cell detects the geographic location information of the user terminal served by the small cell. The small cell sends the geographic location information to the M2M platform device by using the first interface connected to the service interface of the M2M platform device, so that the M2M platform device sends the geographic location information to the application server, the application server generates the control command for the M2M device according to the geographic location information, the M2M platform device receives the control command sent by the application server and sends the control command to the M2M device by using the M2M gateway device, and the M2M device executes the control command. In this way, convergence of the small cell and the M2M system can be implemented.

Figure 4:
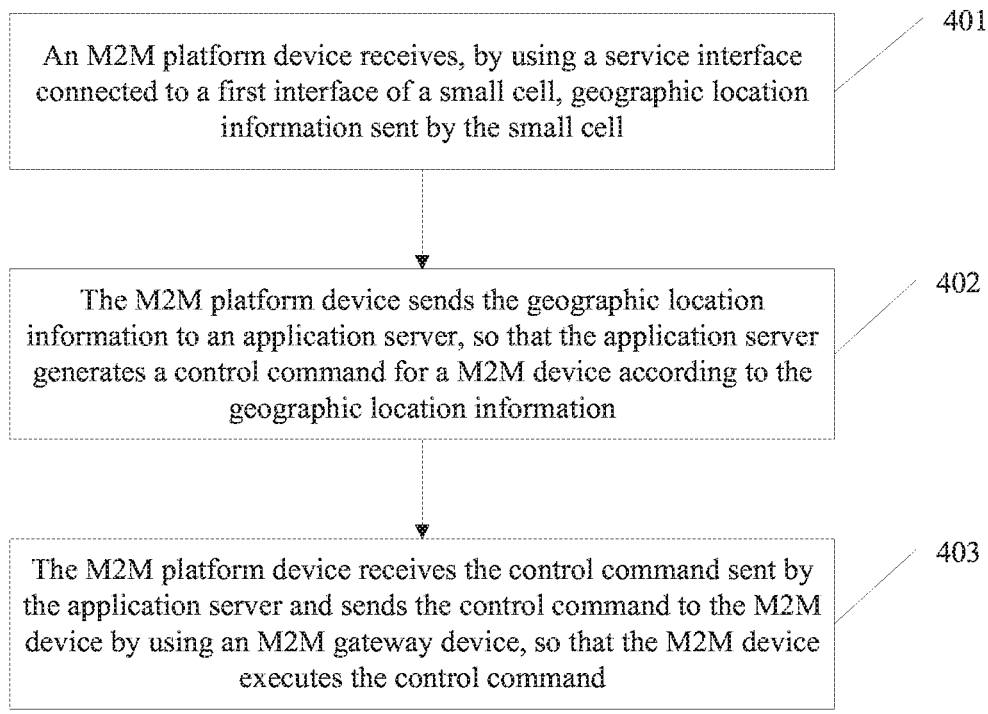
FIG. 4 is a schematic flowchart of another M2M device control method according to an embodiment of the present invention.

Referring to FIG. 4, FIG. 4 is a schematic flowchart of another M2M device control method according to an embodiment of the present invention. As shown in FIG. 4, the method includes the following steps.

401. An M2M platform device receives, by using a service interface connected to a first interface of a small cell, geographic location information sent by the small cell, where the geographic location information is geographic location information, detected by the small cell, of a user terminal served by the small cell.

402. The M2M platform device sends the geographic location information to an application server, so that the application server generates a control command for a M2M device according to the geographic location information.

403. The M2M platform device receives the control command sent by the application server and sends the control command to the M2M device by using an M2M gateway device, so that the M2M device executes the control command.

According to the foregoing steps, the geographic location information detected by the small cell may be used as an input of an M2M system, and then the M2M system controls a corresponding device according to the input. This implements convergence of the small cell and the M2M system.

In this embodiment, the foregoing method may further include the following step: establishing, by the M2M platform device, the service interface, and establishing a communication connection to the first interface of the small cell by using the service interface; and the step in which the M2M platform device receives, by using the service interface connected to the first interface of the small cell, the geographic location information sent by the small cell may include: receiving, by the M2M platform device by using the communication connection, the geographic location information sent by the small cell.

It should be noted that the method described in this embodiment may be applied to the network architectures shown in FIG. 1 and FIG. 2. In addition, implementations described in the network architectures shown in FIG. 1 and FIG. 2 may also be applied to the method. Details are not further described herein.

In this embodiment, the M2M platform device receives, by using the service interface connected to the first interface of the small cell, the geographic location information sent by the small cell. The geographic location information is the geographic location information, detected by the small cell, of the user terminal served by the small cell. The M2M platform device sends the geographic location information to the application server, and the application server generates the control command for the M2M device according to the geographic location information. The M2M platform device receives the control command sent by the application server and sends the control command to the M2M device by using the M2M gateway device, so that the M2M device executes the control command. In this way, convergence of the small cell and the M2M system can be implemented.

Figure 5:
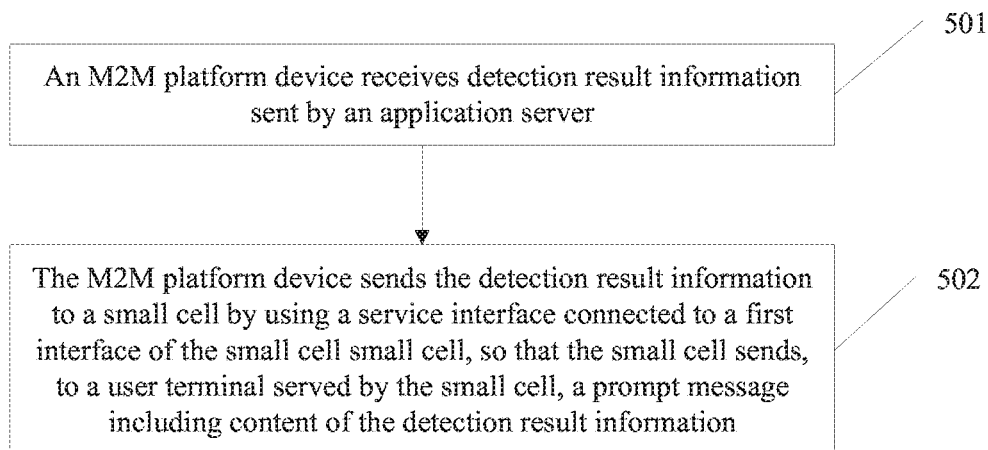
FIG. 5 is a schematic flowchart of a message prompt method according to an embodiment of the present invention.

Referring to FIG. 5, FIG. 5 is a schematic flowchart of a message prompt method according to an embodiment of the present invention. As shown in FIG. 5, the method includes the following steps.

501. An M2M platform device receives detection result information sent by an application server, where the detection result information is a detection result that is reported by an M2M device and that, as determined by the application server, needs to be notified to a user, and the detection result is a detection result obtained by detecting a preset object by the M2M device.

It may be that the M2M device sends the detection result to the application server after detecting the detection result, and then the application server determines whether the detection result needs to be notified to a user. If the detection result needs to be notified to the user, the detection result information is sent to the M2M platform device.

502. The M2M platform device sends the detection result information to a small cell by using a service interface connected to a first interface of the small cell, so that the small cell sends, to a user terminal served by the small cell, a prompt message including content of the detection result information.

When receiving the detection result information, the small cell may send the prompt message including content of the detection result information to the user terminal, to prompt the user.

In this embodiment, there may be a specific relationship between the user terminal that receives the prompt message and the M2M device that detects the preset object. The user terminal that receives the prompt message may be bound in advance to the M2M device that detects the preset object. For example, a security guard or an administrator may be bound to the M2M device in advance, so that the security guard or the administrator can be notified in a timely manner. Alternatively, the user terminal that receives the prompt message may be at a same location as the M2M device that detects the preset object. For example, when detecting a fault, the M2M device notifies a local user. In addition, in this embodiment, the user terminal that receives the prompt message may be determined by the application server according to the M2M device. For example, the detection result information sent by the application server carries an identifier of the user terminal. Alternatively, the user terminal that receives the prompt message is determined by the small cell. For example, the small cell selects, according to the detection result information, a specific user terminal as a user terminal that the prompt message needs to be sent to.

In this embodiment, according to the foregoing steps, the detection result detected in an M2M system may be used as an input of the small cell, and the small cell may provide a corresponding prompt according to the detection result information, to implement convergence of the small cell and the M2M system.

In this embodiment, the method may further include the following step: establishing, by the M2M platform device, the service interface, and establishing a communication connection to the first interface of the small cell by using the service interface; and that the M2M platform device receives, by using the service interface connected to the first interface of the small cell, the geographic location information sent by the small cell includes: receiving, by the M2M platform device by using the communication connection, the geographic location information sent by the small cell.

It should be noted that the method described in this embodiment may be applied to the network architectures shown in FIG. 1 and FIG. 2. In addition, implementations described in the network architectures shown in FIG. 1 and FIG. 2 may also be applied to the method. Details are not further described herein.

In this embodiment, the M2M platform device receives the detection result information sent by the application server. The detection result information is the detection result that is reported by the M2M device and that, as determined by the application server, needs to be notified to the user, and the detection result is the detection result obtained by detecting the preset object by the M2M device. The M2M platform device sends the detection result information to the small cell by using the service interface connected to the first interface of the small cell, so that the small cell sends, to the user terminal served by the small cell, the prompt message including the content of the detection result information. In this way, convergence of the small cell and the M2M system can be implemented.

Figure 6:
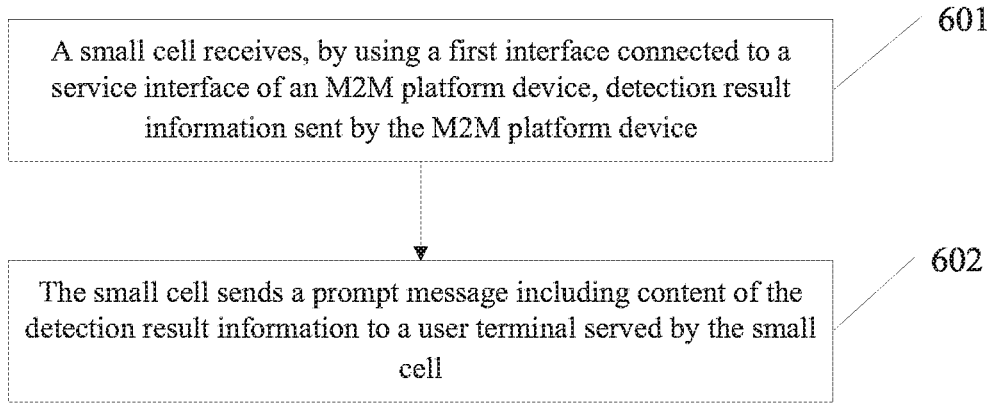
FIG. 6 is a schematic flowchart of another message prompt method according to an embodiment of the present invention.

Referring to FIG. 6, FIG. 6 is a schematic flowchart of another message prompt method according to an embodiment of the present invention. As shown in FIG. 6, the method includes the following steps.

601. A small cell receives, by using a first interface connected to a service interface of an M2M platform device, detection result information sent by the M2M platform device, where the detection result information is sent by an application server and is received by the M2M platform device, the detection result information is a detection result that is reported by an M2M device and that, as determined by the application server, needs to be notified to a user, and the detection result is a detection result obtained by detecting a preset object by the M2M device.

602. The small cell sends a prompt message including content of the detection result information to a user terminal served by the small cell.

In this embodiment, according to the foregoing steps, the detection result detected in an M2M system may be used as an input of the small cell, and the small cell may provide a corresponding prompt according to the detection result information, to implement convergence of the small cell and the M2M system.

In this embodiment, there may be a specific relationship between the user terminal that receives the prompt message and the M2M device that detects the preset object. The user terminal that receives the prompt message may be bound in advance to the M2M device that detects the preset object. For example, a security guard or an administrator may be bound to the M2M device in advance, so that the security guard or the administrator can be notified in a timely manner. Alternatively, the user terminal that receives the prompt message may be at a same location as the M2M device that detects the preset object. For example, when detecting a fault, the M2M device notifies a local user. In addition, in this embodiment, the user terminal that receives the prompt message may be determined by the application server according to the M2M device. For example, the detection result information sent by the application server carries an identifier of the user terminal. Alternatively, the user terminal that receives the prompt message is determined by the small cell. For example, the small cell selects, according to the detection result information, a specific user terminal as a user terminal that the prompt message needs to be sent to.

In this embodiment, the foregoing method may further include the following step: establishing, by the small cell, the first interface, and establishing a communication connection to the service interface of the M2M platform device by using the first interface; and the step in which the small cell receives, by using the first interface connected to the service interface of the machine-to-machine M2M platform device, the detection result information sent by the M2M platform device may include: receiving, by the small cell by using the communication connection, the detection result information sent by the M2M platform device.

In this embodiment, the foregoing method may further include the following step: connecting, by the small cell, to the M2M device by using a second interface, where the small cell provides network access for the M2M device by using the second interface.

It should be noted that the method described in this embodiment may be applied to the network architectures shown in FIG. 1 and FIG. 2. In addition, implementations described in the network architectures shown in FIG. 1 and FIG. 2 may also be applied to the method. Details are not further described herein.

In this embodiment, the small cell receives, by using the first interface connected to the service interface of the M2M platform device, the detection result information sent by the M2M platform device. The detection result information is sent by the application server and is received by the M2M platform device, and the detection result information is the detection result that is reported by the M2M device and that, as determined by the application server, needs to be notified to the user. The detection result is the detection result obtained by detecting the preset object by the M2M device. The small cell sends, to the user terminal served by the small cell, the prompt message including the content of the detection result information. In this way, convergence of the small cell and the M2M system can be implemented.

Figure 7:
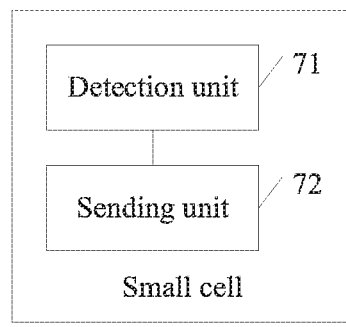
FIG. 7 is a schematic structural diagram of a small cell according to an embodiment of the present invention.

Referring to FIG. 7, FIG. 7 is a schematic structural diagram of a small cell according to an embodiment of the present invention. As shown in FIG. 7, the small cell includes a detection unit 71 and a sending unit 72.

The detection unit 71 is configured to detect geographic location information of a user terminal served by the small cell.

The sending unit 72 is configured to send the geographic location information to an M2M platform device by using a first interface connected to a service interface of the M2M platform device, so that the M2M platform device sends the geographic location information to an application server, the application server generates a control command for an M2M device according to the geographic location information, the M2M platform device receives the control command sent by the application server and sends the control command to the M2M device by using an M2M gateway device, and the M2M device executes the control command.

Figure 8:
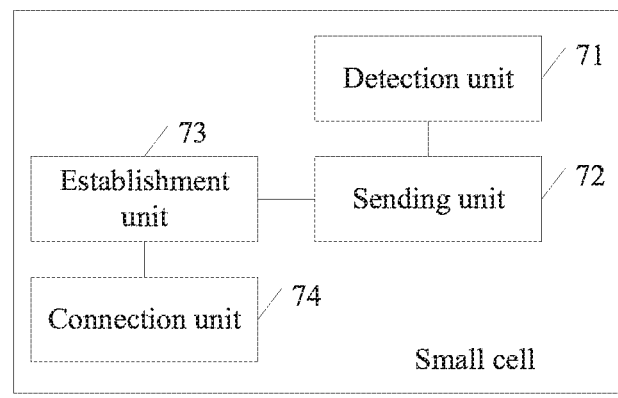
FIG. 8 is a schematic structural diagram of another small cell according to an embodiment of the present invention.

In this embodiment, as shown in FIG. 8, the small cell may further include: an establishment unit 73, configured to establish the first interface, and establish a communication connection to the service interface of the M2M platform device by using the first interface.

The sending unit 72 is configured to send the geographic location information to the M2M platform device by using the communication connection.

In this embodiment, as shown in FIG. 8, the small cell may further include: a connection unit 74, configured to connect to the M2M device by using a second interface, where the small cell provides network access for the M2M device by using the second interface.

It should be noted that the small cell described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the small cell detects the geographic location information of the user terminal served by the small cell. The small cell sends the geographic location information to the M2M platform device by using the first interface connected to the service interface of the M2M platform device, so that the M2M platform device sends the geographic location information to the application server, the application server generates the control command for the M2M device according to the geographic location information, the M2M platform device receives the control command sent by the application server and sends the control command to the M2M device by using the M2M gateway device, and the M2M device executes the control command. In this way, convergence of the small cell and the M2M system can be implemented.

Figure 9:
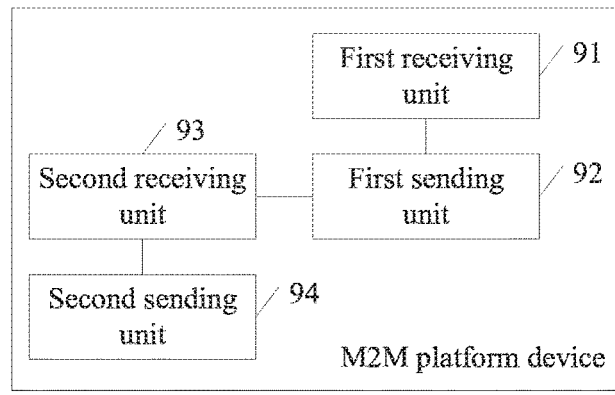
FIG. 9 is a schematic structural diagram of an M2M platform device according to an embodiment of the present invention.

Referring to FIG. 9, FIG. 9 is a schematic structural diagram of an M2M platform device according to an embodiment of the present invention. As shown in FIG. 9, the M2M platform device includes: a first receiving unit 91, a first sending unit 92, a second receiving unit 93, and a second sending unit 94.

The first receiving unit 91 is configured to receive, by using a service interface connected to a first interface of a small cell, geographic location information sent by the small cell, where the geographic location information is geographic location information, detected by the small cell, of a user terminal served by the small cell.

The first sending unit 92 is configured to send the geographic location information to an application server, so that the application server generates a control command for an M2M device according to the geographic location information.

The second receiving unit 93 is configured to receive the control command sent by the application server.

The second sending unit 94 is configured to send the control command to the M2M device by using an M2M gateway device, so that the M2M device executes the control command.

Figure 10:
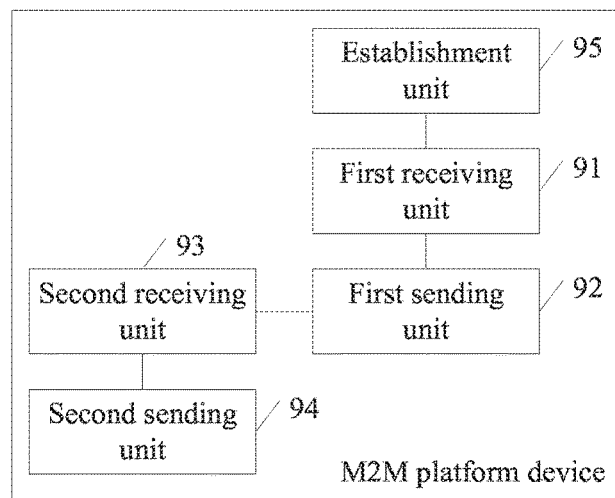
FIG. 10 is a schematic structural diagram of another M2M platform device according to an embodiment of the present invention.

In this embodiment, as shown in FIG. 10, the M2M platform device may further include: an establishment unit 95, configured to establish the service interface, and establish a communication connection to the first interface of the small cell by using the service interface.

The first receiving unit 91 may be configured to receive, by using the communication connection, the geographic location information sent by the small cell.

It should be noted that the M2M platform device described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the M2M platform device receives, by using the service interface connected to the first interface of the small cell, the geographic location information sent by the small cell. The geographic location information is the geographic location information, detected by the small cell, of the user terminal served by the small cell. The M2M platform device sends the geographic location information to the application server, and the application server generates the control command for the M2M device according to the geographic location information. The M2M platform device receives the control command sent by the application server and sends the control command to the M2M device by using the M2M gateway device, so that the M2M device executes the control command. In this way, convergence of the small cell and the M2M system can be implemented.

Figure 11:
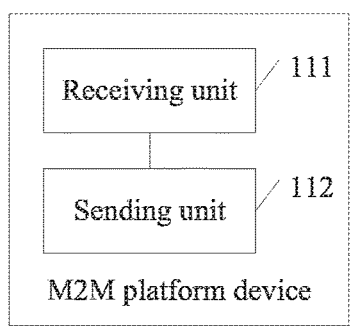
FIG. 11 is a schematic structural diagram of another M2M platform device according to an embodiment of the present invention.

Referring to FIG. 11, FIG. 11 is a schematic structural diagram of another M2M platform device according to an embodiment of the present invention. As shown in FIG. 11, the M2M platform device includes a receiving unit 111 and a sending unit 112.

The receiving unit 111 is configured to receive detection result information sent by an application server. The detection result information is a detection result that is reported by an M2M device and that, as determined by the application server, needs to be notified to a user, and the detection result is a detection result obtained by detecting a preset object by the M2M device.

The sending unit 112 is configured to send the detection result information to a small cell by using a service interface connected to a first interface of the small cell, so that the small cell sends, to a user terminal served by the small cell, a prompt message including content of the detection result information.

Figure 12:
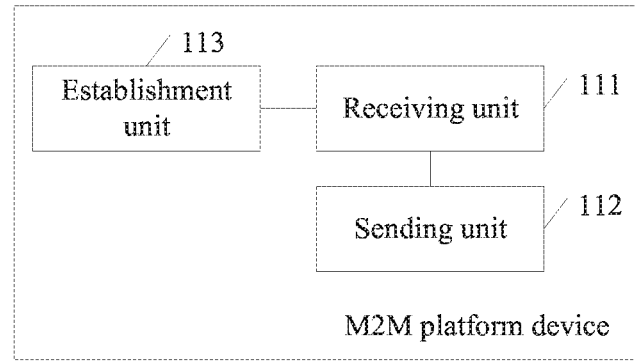
FIG. 12 is a schematic structural diagram of another M2M platform device according to an embodiment of the present invention.

In this embodiment, as shown in FIG. 12, the M2M platform device may further include: an establishment unit 113, configured to establish the service interface, and establish a communication connection to the first interface of the M2M platform device by using the service interface.

The sending unit 112 can be configured to send the detection result information to the small cell by using the communication connection.

It should be noted that the M2M platform device described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the M2M platform device receives the detection result information sent by the application server. The detection result information is the detection result that is reported by the M2M device and that, as determined by the application server, needs to be notified to the user, and the detection result is the detection result obtained by detecting the preset object by the M2M device. The M2M platform device sends the detection result information to the small cell by using the service interface connected to the first interface of the small cell, so that the small cell sends, to the user terminal served by the small cell, the prompt message including the content of the detection result information. In this way, convergence of the small cell and the M2M system can be implemented.

Figure 13:
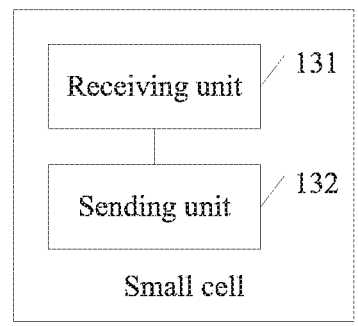
FIG. 13 is a schematic structural diagram of another small cell according to an embodiment of the present invention.

Referring to FIG. 13, FIG. 13 is a schematic structural diagram of another small cell according to an embodiment of the present invention. As shown in FIG. 13, the small cell includes a receiving unit 131 and a sending unit 132.

The receiving unit 131 is configured to receive, by using a first interface connected to a service interface of an M2M platform device, detection result information sent by the M2M platform device. The detection result information is sent by an application server and is received by the M2M platform device, and the detection result information is a detection result that is reported by an M2M device and that, as determined by the application server, needs to be notified to a user. The detection result is a detection result obtained by detecting a preset object by the M2M device.

The sending unit 132 is configured to send, to a user terminal served by the small cell, a prompt message including content of the detection result information.

Figure 14:
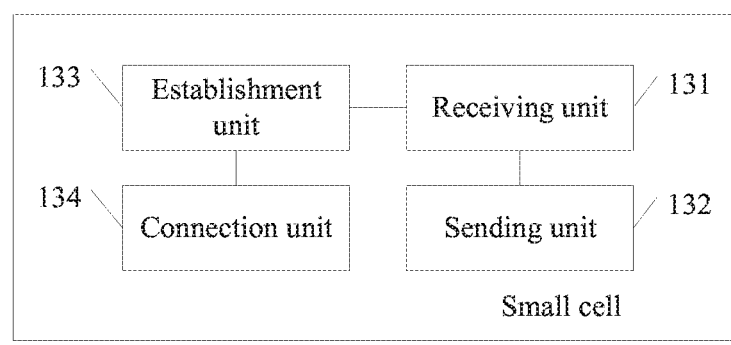
FIG. 14 is a schematic structural diagram of another small cell according to an embodiment of the present invention.

In this embodiment, as shown in FIG. 14, the small cell may further include: an establishment unit 133, configured to establish the first interface, and establish a communication connection to the service interface of the M2M platform device by using the first interface.

The receiving unit 131 can be configured to receive, by using the communication connection, the detection result information sent by the M2M platform device.

In this embodiment, as shown in FIG. 14, the small cell may further include: a connection unit 134, configured to connect to the M2M device by using a second interface, where the small cell provides network access for the M2M device by using the second interface.

It should be noted that the small cell described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the small cell receives, by using the first interface connected to the service interface of the M2M platform device, the detection result information sent by the M2M platform device. The detection result information is sent by the application server and is received by the M2M platform device, and the detection result information is the detection result that is reported by the M2M device and that, as determined by the application server, needs to be notified to the user. The detection result is the detection result obtained by detecting the preset object by the M2M device. The small cell sends, to the user terminal served by the small cell, the prompt message including the content of the detection result information. In this way, convergence of the small cell and the M2M system can be implemented.

Figure 15:
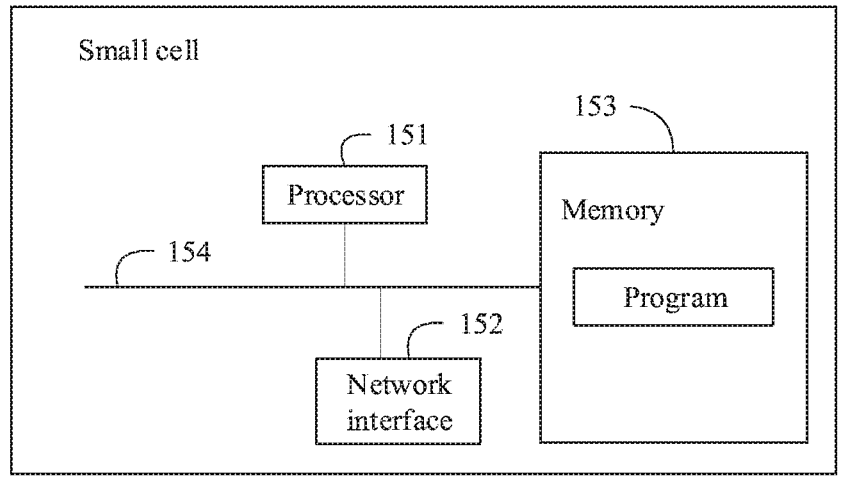
FIG. 15 is a schematic structural diagram of another small cell according to an embodiment of the present invention.

Referring to FIG. 15, FIG. 15 is a schematic structural diagram of another small cell according to an embodiment of the present invention. As shown in FIG. 15, the small cell includes: a processor 151, a network interface 152, a memory 153, and a communications bus 154. The communications bus 154 is configured to implement connection and communication between the processor 151, the network interface 152, and the memory 153. The processor 151 executes a program stored in the memory 153 to implement the following method: detecting geographic location information of a user terminal served by the small cell; and sending the geographic location information to an M2M platform device by using a first interface connected to a service interface of the M2M platform device, so that the M2M platform device sends the geographic location information to an application server, the application server generates a control command for an M2M device according to the geographic location information, the M2M platform device receives the control command sent by the application server and sends the control command to the M2M device by using an M2M gateway device, and the M2M device executes the control command.

In this embodiment, the program executed by the processor 151 may further include: establishing the first interface, and establishing a communication connection to the service interface of the M2M platform device by using the first interface.

The program, executed by the processor 151, of sending the geographic location information to an M2M platform device by using a first interface connected to a service interface of the M2M platform device may include: sending the geographic location information to the M2M platform device by using the communication connection.

In this embodiment, the program executed by the processor 151 may further include: connecting to the M2M device by using a second interface, where the small cell provides network access for the M2M device by using the second interface.

It should be noted that the small cell described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the small cell detects the geographic location information of the user terminal served by the small cell. The small cell sends the geographic location information to the M2M platform device by using the first interface connected to the service interface of the M2M platform device, so that the M2M platform device sends the geographic location information to the application server, the application server generates the control command for the M2M device according to the geographic location information, the M2M platform device receives the control command sent by the application server and sends the control command to the M2M device by using the M2M gateway device, and the M2M device executes the control command. In this way, convergence of the small cell and the M2M system can be implemented.

Figure 16:
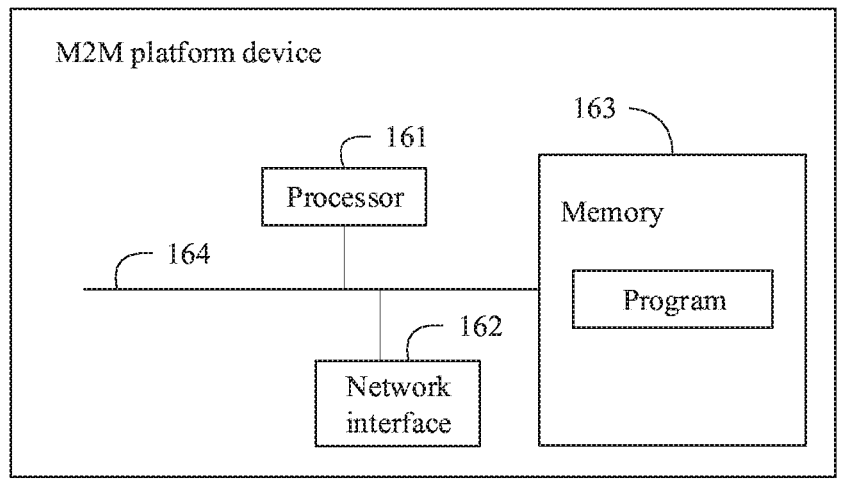
FIG. 16 is a schematic structural diagram of another M2M platform device according to an embodiment of the present invention.

Referring to FIG. 16, FIG. 16 is a schematic structural diagram of another M2M platform device according to an embodiment of the present invention. As shown in FIG. 16, the M2M platform device includes: a processor 161, a network interface 162, a memory 163, and a communications bus 164. The communications bus 164 is configured to implement connection and communication between the processor 161, the network interface 162, and the memory 163. The processor 161 executes a program stored in the memory 163 to implement the following method: receiving, by using a service interface connected to a first interface of a small cell, geographic location information sent by the small cell, where the geographic location information is geographic location information, detected by the small cell, of a user terminal served by the small cell; sending the geographic location information to an application server, so that the application server generates a control command for an M2M device according to the geographic location information; and receiving the control command sent by the application server, and sending the control command to the M2M device by using an M2M gateway device, so that the M2M device executes the control command.

In this embodiment, the program executed by the processor 161 may further include: establishing the service interface, and establishing a communication connection to the first interface of the small cell by using the service interface.

The program, executed by the processor 161, of receiving, by using a service interface connected to a first interface of a small cell, geographic location information sent by the small cell may include: receiving, by using the communication connection, the geographic location information sent by the small cell.

It should be noted that the M2M platform device described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the M2M platform device receives, by using the service interface connected to the first interface of the small cell, the geographic location information sent by the small cell. The geographic location information is the geographic location information, detected by the small cell, of the user terminal served by the small cell. The M2M platform device sends the geographic location information to the application server, and the application server generates the control command for the M2M device according to the geographic location information. The M2M platform device receives the control command sent by the application server and sends the control command to the M2M device by using the M2M gateway device, so that the M2M device executes the control command. In this way, convergence of the small cell and the M2M system can be implemented.

Figure 17:
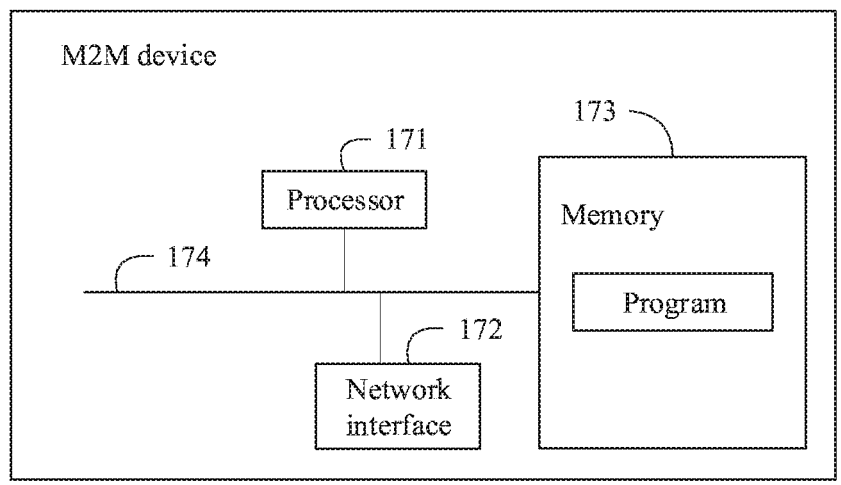
FIG. 17 is a schematic structural diagram of another M2M platform device according to an embodiment of the present invention.

Referring to FIG. 17, FIG. 17 is a schematic structural diagram of another M2M platform device according to an embodiment of the present invention. As shown in FIG. 17, the M2M platform device includes: a processor 171, a network interface 172, a memory 173, and a communications bus 174. The communications bus 174 is configured to implement connection and communication between the processor 171, the network interface 172, and the memory 173. The processor 171 executes a program stored in the memory 173 to implement the following method: receiving detection result information sent by an application server, where the detection result information is a detection result that is reported by an M2M device and that, as determined by the application server, needs to be notified to a user, and the detection result is a detection result obtained by detecting a preset object by the M2M device; and sending the detection result information to a small cell by using a service interface connected to a first interface of the small cell, so that the small cell sends, to a user terminal served by the small cell, a prompt message including content of the detection result information.

In this embodiment, the program executed by the processor 171 may further include: establishing the service interface, and establishing a communication connection to the first interface of the small cell by using the service interface.

The program, executed by the processor 171, of sending the detection result information to a small cell by using a service interface connected to a first interface of the small cell may include: sending the detection result information to the small cell by using the communication connection.

It should be noted that the M2M platform device described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the M2M platform device receives the detection result information sent by the application server. The detection result information is the detection result that is reported by the M2M device and that, as determined by the application server, needs to be notified to the user, and the detection result is the detection result obtained by detecting the preset object by the M2M device. The M2M platform device sends the detection result information to the small cell by using the service interface connected to the first interface of the small cell, so that the small cell sends, to the user terminal served by the small cell, the prompt message including the content of the detection result information. In this way, convergence of the small cell and the M2M system can be implemented.

Figure 18:
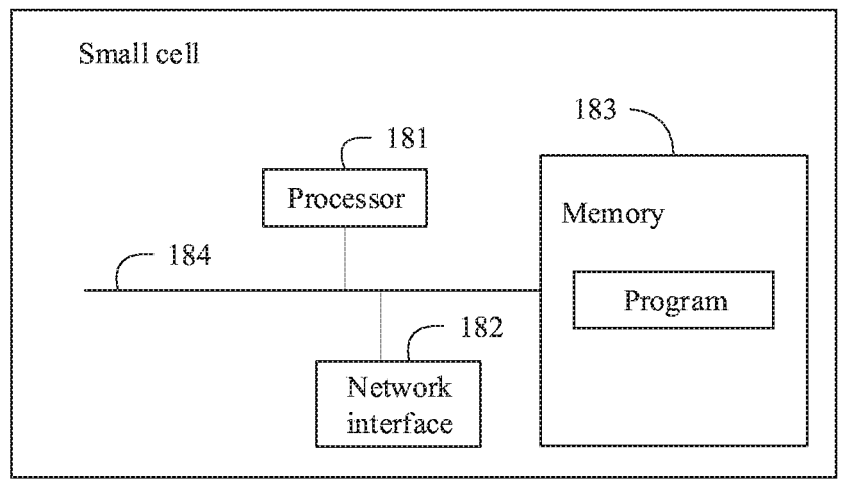
FIG. 18 is a schematic structural diagram of another small cell according to an embodiment of the present invention.

Referring to FIG. 18, FIG. 18 is a schematic structural diagram of another small cell according to an embodiment of the present invention. As shown in FIG. 18, the small cell includes: a processor 181, a network interface 182, a memory 183, and a communications bus 184. The communications bus 184 is configured to implement connection and communication between the processor 181, the network interface 182, and the memory 183. The processor 181 executes a program stored in the memory 183 to implement the following method: receiving, by using a first interface connected to a service interface of a machine-to-machine M2M platform device, detection result information sent by the M2M platform device, where the detection result information is sent by an application server and is received by the M2M platform device, the detection result information is a detection result that is reported by an M2M device and that, as determined by the application server, needs to be notified to a user, and the detection result is a detection result obtained by detecting a preset object by the M2M device; and sending a prompt message including content of the detection result information to a user terminal served by the small cell.

In this embodiment, the program executed by the processor 181 may further include: establishing the first interface, and establishing a communication connection to the service interface of the M2M platform device by using the first interface.

The program, executed by the processor 181, receiving, by using a first interface connected to a service interface of a machine-to-machine M2M platform device, detection result information sent by the M2M platform device may include: receiving, by using the communication connection, the detection result information sent by the M2M platform device.

In this embodiment, the program executed by the processor 181 may further include: connecting to the M2M device by using a second interface, where the small cell provides network access for the M2M device by using the second interface.

It should be noted that the small cell described in this embodiment may be applied to the network architectures shown in FIG. 1 and FIG. 2. In addition, implementations described in the network architectures shown in FIG. 1 and FIG. 2 may also be applied to this embodiment. Details are not further described herein.

In this embodiment, the small cell receives, by using the first interface connected to the service interface of the M2M platform device, the detection result information sent by the M2M platform device. The detection result information is sent by the application server and is received by the M2M platform device, and the detection result information is the detection result that is reported by the M2M device and that, as determined by the application server, needs to be notified to the user. The detection result is the detection result obtained by detecting the preset object by the M2M device.

The small cell sends, to the user terminal served by the small cell, the prompt message including the content of the detection result information. In this way, convergence of the small cell and the M2M system can be implemented.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

What is disclosed above is merely embodiments of the present invention, and certainly is not intended to limit the protection scope of the present invention. Therefore, equivalent variations made in accordance with the claims of the present invention shall fall within the scope of the present invention.

What is claimed is:

1. A network architecture, comprising:
   a small cell in a small cell system; and
   a machine-to-machine (M2M) platform device in an M2M system,
   wherein the small cell is connected to a service interface of the M2M platform device by a first interface, wherein service data in the M2M system is transmitted between the small cell and the M2M platform device using the first interface, wherein the small cell is configured to send the service data to a user terminal in accordance with a determination, by the M2M system, that the service data is to be sent to the user terminal served by the small cell, wherein the determination by the M2M system is in accordance to a distance between a first geographic location of the user terminal and a second geographic location of an M2M device in the M2M system,
   wherein the M2M device comprises a currently-controlled M2M device, and
   wherein the M2M platform device is configured to send geographic location information to an application server, causing the application server to:
      select, according to the geographic location information, an M2M device to be controlled currently as the currently-controlled M2M device,
      generate a control command for the M2M device according to a preset control policy and corresponding to the geographic location information, and
      use the control command as the control command for the currently-controlled M2M device.

2. The network architecture according to claim 1, wherein:
   the service data comprises the geographic location information;
   the small cell is configured to detect the geographic location information of the user terminal, and send the geographic location information to the M2M platform device using the first interface; and
   the M2M platform device is configured to receive the control command sent by the application server, and send the control command to the M2M device using an M2M gateway device, and the M2M device is configured to execute the control command.

3. The network architecture according to claim 2, wherein:
   the service data comprises detection result information to be notified to a user;

the M2M device is further configured to detect a preset object to obtain a detection result, and send the detection result to the application server;

the application server is configured to send the detection result information to the M2M platform device in response to determining that the detection result is the detection result information to be notified to the user;

the M2M platform device is further configured to send the detection result information to the small cell using the service interface; and the small cell is further configured to send a prompt message comprising content of the detection result information to the user terminal.

4. The network architecture according to claim 3, wherein:

the user terminal comprises a currently-notified user terminal;

the application server is further configured to select a user terminal corresponding to the M2M device as the currently-notified user terminal; and the M2M platform device is configured to send, using the service interface, the detection result information to a small cell that serves the currently-notified user terminal.

5. The network architecture according to claim 4, wherein the application server is configured to select as the currently-notified user terminal either a user terminal that is bound to the M2M device in advance, or the user terminal with the distance between the first geographic location of the user terminal and the second geographic location of the M2M device being within a preset distance.

6. The network architecture according to claim 1, wherein the small cell is further connected to the M2M device using a second interface, and wherein the small cell is configured to provide network access for the M2M device using the second interface.

7. A method, comprising:

detecting, by a small cell, geographic location information of a user terminal served by the small cell;

sending, by the small cell, the geographic location information to a machine-to-machine (M2M) platform device using a first interface connected to a service interface of the M2M platform device, causing the M2M platform device to send the geographic location information to an application server, causing the application server to select, according to the geographic location information, an M2M device to be controlled currently as a currently-controlled M2M device, to generate a control command for the M2M device according to a preset control policy and corresponding to the geographic location information, and to use the control command as the control command for the currently-controlled M2M device, causing the M2M platform device to receive the control command sent by the application server and to send the control command to the currently-controlled M2M device using an M2M gateway device, and causing the currently-controlled M2M device to execute the control command; and sending, by the small cell, service data to the user terminal in accordance with a determination, by a M2M system, that the service data is to be sent to the user terminal served by the small cell, wherein the determination by the M2M system is in accordance to a distance between a first geographic location of the user terminal and a second geographic location of the currently-controlled M2M device in the M2M system, and wherein the M2M system comprises the M2M platform device.

8. The method according to claim 7, wherein:

the method further comprises establishing, by the small cell, the first interface, and establishing a communication connection to the service interface of the M2M platform device using the first interface; and sending, by the small cell, the geographic location information to the M2M platform device using the first interface connected to the service interface of the M2M platform device comprises:

sending, by the small cell, the geographic location information to the M2M platform device using the communication connection.

9. The method according to claim 7, further comprising:

connecting, by the small cell, to the currently-controlled M2M device using a second interface, wherein the small cell provides network access for the currently-controlled M2M device using the second interface.

10. A method, comprising:

receiving, by a machine-to-machine (M2M) platform device using a service interface connected to a first interface of a small cell, geographic location information sent by the small cell, wherein the geographic location information is geographic location information, detected by the small cell, of a user terminal served by the small cell;

sending, by the M2M platform device, the geographic location information to an application server, causing the application server to select, according to the geographic location information, an M2M device to be controlled currently as a currently-controlled M2M device, to generate a control command for a M2M device according to a preset control policy and corresponding to the geographic location information, and to use the control command as the control command for the currently-controlled M2M device, and causing the small cell to send service data to the user terminal in accordance with a determination, by a M2M system, that the service data is to be sent to the user terminal served by the small cell, wherein the determination by the M2M system is in accordance to a distance between a first geographic location of the user terminal and a second geographic location of the currently-controlled M2M device in the M2M system, and wherein the M2M system comprises the M2M platform device; and receiving, by the M2M platform device, the control command sent by the application server, and sending the control command to the currently-controlled M2M device using an M2M gateway device, causing the currently-controlled M2M device to execute the control command.

11. The method according to claim 10, wherein:

the method further comprises establishing, by the M2M platform device, the service interface, and establishing a communication connection to the first interface of the small cell using the service interface; and receiving, by the M2M platform device using the service interface connected to the first interface of the small cell, the geographic location information sent by the small cell comprises:

receiving, by the M2M platform device using the communication connection, the geographic location information sent by the small cell.

12. A small cell, comprising:

a processor;

a network interface;

a non-transitory computer-readable storage medium; and a communications bus, wherein the communications bus is configured to implement connection and communication between the processor, the network interface, and the non-transitory computer-readable storage medium;

wherein the non-transitory computer-readable storage medium stores a program to be executed by the processor, the program including instructions to:

detect geographic location information of a user terminal served by the small cell;

send the geographic location information to an M2M platform device using a first interface connected to a service interface of the M2M platform device, causing the M2M platform device to send the geographic location information to an application server, causing the application server to select, according to the geographic location information, an M2M device to be controlled currently as a currently-controlled M2M device, to generate a control command for the M2M device according to a preset control policy and corresponding to the geographic location information, and to use the control command as the control command for the currently-controlled M2M device, causing the M2M platform device to receive the control command sent by the application server and to send the control command to the currently-controlled M2M device using an M2M gateway device, and causing the currently-controlled M2M device to execute the control command; and send service data to the user terminal in accordance with a determination, by a M2M system, that the service data is to be sent to the user terminal served by the small cell, wherein the determination by the M2M system is in accordance to a distance between a first geographic location of the user terminal and a second geographic location of the currently-controlled M2M device in the M2M system, and wherein the M2M system comprises the M2M platform device.

13. The small cell according to claim 12, wherein:

the program further includes instructions to establish the first interface, and establish a communication connection to the service interface of the M2M platform device using the first interface; and sending the geographic location information to the M2M platform device using the first interface connected to the service interface of the M2M platform device comprises:

sending the geographic location information to the M2M platform device using the communication connection.

14. The small cell according to claim 12, wherein the program further includes instructions to:

connect to the currently-controlled M2M device using a second interface, wherein the small cell provides network access for the currently-controlled M2M device using the second interface.

15. A machine-to-machine (M2M) device, comprising:
a processor;
a network interface;
a non-transitory computer-readable storage medium; and
a communications bus, wherein the communications bus is configured to implement connection and communication between the processor, the network interface, and the non-transitory computer-readable storage medium;

wherein the non-transitory computer-readable storage medium stores a program to be executed by the processor, the program including instructions to:

receive, using a service interface connected to a first interface of a small cell, geographic location information sent by the small cell, wherein the geographic location information is geographic location information, detected by the small cell, of a user terminal served by the small cell;

send the geographic location information to an application server, causing the application server to select, according to the geographic location information, the M2M device to be controlled currently as a currently-controlled M2M device, to generate a control command for the M2M device according to a preset control policy and corresponding to the geographic location information, and to use the control command as the control command for the M2M device, and causing the small cell to send service data to the user terminal in accordance with a determination, by a M2M system, that the service data is to be sent to the user terminal served by the small cell, wherein the determination by the M2M system is in accordance to a distance between a first geographic location of the user terminal and a second geographic location of the M2M device in the M2M system;

receive the control command sent by the application server, using an M2M gateway device, causing the M2M device to; and execute the control command.

16. The M2M device according to claim 15, wherein:

the program further includes instructions to establish the service interface, and establish a communication connection to the first interface of the small cell using the service interface; and receiving, using the service interface connected to the first interface of the small cell, geographic location information sent by the small cell comprises:

receiving, using the communication connection, the geographic location information sent by the small cell.

* * * * *